United States Patent [19]

Shibata et al.

[11] Patent Number: 4,519,005
[45] Date of Patent: May 21, 1985

[54] MAGNETIC TAPE REPRODUCING APPARATUS

[75] Inventors: Akira Shibata; Koichi Hirose; Akihiro Yamamoto, all of Katsuta, Japan

[73] Assignee: Hitachi, Ltd., Tokyo, Japan

[21] Appl. No.: 532,896

[22] Filed: Sep. 16, 1983

Related U.S. Application Data

[63] Continuation of Ser. No. 248,534, Mar. 27, 1981.

[30] Foreign Application Priority Data

Mar. 28, 1980 [JP]  Japan .............................. 55-38934

[51] Int. Cl.$^3$ .......................... G11B 5/45; G11B 15/02
[52] U.S. Cl. .......................................... 360/65; 360/67
[58] Field of Search ................................... 360/65, 67

[56] References Cited

U.S. PATENT DOCUMENTS 3,340,367 9/1967 Coleman, Jr. et al. ............... 360/65
4,134,140 1/1979 Wright et al. ......................... 360/65
4,210,942 7/1980 Nakamura et al. ................... 360/65

Primary Examiner—Vincent P. Canney
Attorney, Agent, or Firm—Antonelli, Terry & Wands

[57] ABSTRACT

A magnetic tape reproducing apparatus includes a plurality of playback heads, a plurality of damping circuits for damping output signals from the associated playback heads, a switching circuit for sequentially passing the output signals from the plurality of damping circuits, a reproduction equalizer for creating substantially a total reproduction equalizing characteristic for the output signal from the switching circuit which signal is subjected to a peaking characteristic, and a signal processor for converting the output signal of the reproduction equalizer to a recorded information signal. Each damping circuit serves to damp the output from the associated playback head so that the peaking characteristic created by its equivalent resonant capacitance, its equivalent damping resistance, the inductance of the associated playback head and the capacitance thereof does not govern the total equalizing characteristic.

7 Claims, 22 Drawing Figures

MAGNETIC TAPE REPRODUCING APPARATUS

CROSS REFERENCES TO RELATED APPLICATIONS

This is a continuation of application Ser. No. 248,534, filed on Mar. 27, 1981.

This invention relates to a technique for dispensing with adjustment of the peaking circuit of heads in the helical scan type magnetic tape reproducing apparatus.

The helical scan type magnetic tape reproducing apparatus used for video signal and for audio PCM signal recording and so on, each has a plurality of playback heads. The conventional apparatus needs two adjustments for each playback head peaking circuit, i.e., a peaking frequency adjustment and a peaking level adjustment. This necessitates not only adjusting separate parts but also much time for adjustment, making the apparatus expensive. Moreover, in case of replacement of the playback head due to wearout, the head peaking circuit for the new head must be adjusted again, which fact results in very poor service for users.

The drawbacks of the conventional reproducing apparatus will hereinafter be described with reference to some of the accompanying drawings.

FIG. 1 is a block diagram of a typical example of the reproducing apparatus of a conventional 2-head helical scan type video tape recorder. In FIG. 1, a magnetic head 1 intermittently reproduces an FM signal for every other field as shown in FIG. 3(a) by numeral 14. The FM signal 14 is supplied via a rotary transformer 3 to a head peaking circuit (head amplifier circuit) including a trimmer capacitor 4 and a variable resistor 5. The head peaking circuit provides a frequency characteristic as shown in FIG. 2 by a curve 13, for the FM signal from the head 1. That is, the peaking frequency is adjusted by the trimmer capacitor 4, and the peaking amount by the variable resistor 5.

The frequency characteristic as shown in FIG. 2 is needed for compensating for high frequency signal loss due to the frequency characteristic of the head and tape, and is substantially constant for the video tape recorder system. For example, for the VHS system video tape recorder, the peaking frequency is 4.5 MHz, and the peaking amount is 10 dB.

In FIG. 1, the peaking frequency is determined by the resonant circuit of the inductance of the head 1 and the total capacitance of the trimmer capacitor 4, the input capacitance of a preamplifier 8 and a stray capacitance. Therefor, the capacitance of the trimmer capacitor 4 is adjusted for compensating for the variation of the peaking frequency due to the variations in value of inductance of head 1, the input capacitance of the preamplifier 8, and the stray capacitance. Here, the preamplifiers 8 and 9 are wide-band high-input impedance amplifiers with low noise and high gain.

The peaking amount is determined by the loss (equivalent series resistance) at the head 1, the input resistance of the preamplifier 8 and the value of the variable resistor 5. The variable resistor 5 is adjusted for compensating the error of peaking amount caused by the variations in the loss of the head 1 and the input resistance of the preamplifier 8. Similarly, the FM signal (as shown in FIG. 3(b) by 15) from the head 2 is adjusted in its frequency characteristic by the head 2, a trimmer capacitor 6 and a variable resistor 7 in accordance with the characteristic as shown in FIG. 2 by the curve 13.

The FM signals from the heads 1 and 2 are adjusted in their frequency characteristics, and then amplified by the preamplifiers 8 and 9, the outputs of which are supplied to a switching amplifier 10. Th switching amplifier 10 alternately pass the outputs from the preamplifiers 8 and 9 thereby to output a continuous FM signal as shown in FIG. 3(c) by 16. This FM signal 16 is demodulated by a signal processor 11 into a video signal (recorded information signal), which is then supplied to an output terminal 12.

The signal processor 11 has a reproduction equalizer circuit (FM equalizer), a limiter, a drop-out compensator, an FM demodulator, a de-emphasis circuit, etc.

Now, one example of the conventional head peaking circuit is shown in U.S. Pat. No. 4,210,942, which shows a head peaking circuit slightly modifying that of FIG. 1 such that the variable resistor 5 is connected across the preamplifier 8 as a negative feedback variable resistor for damping an output signal from the head 1. In this arrangement, the peaking frequency and the peaking amount are adjusted by a trimmer capacitor and the variable resistor respectively. The damping is effected merely to improve a S/N of the output signal from the head, so that the damping amount is small and Q of the peaking circuit is large.

Here, the drawbacks of the conventional reproducing apparatus will be summarized as:

(1) It requires expensive components such as the trimmer capacitors 4 and 6, and variable resistors 5 and 7, which make the apparatus expensive.

(2) The head peaking adjustment is the adjustment including the head, and it is not only difficult to be performed but must be performed for four different elements, which takes much time.

(3) The head peaking characteristic is concerned with the inductance and loss of the video head, and in case of replacing the head due to wearout, it is required to adjust the head peaking circuit for the replacement head. This adjustment requires a special jig and an instrument, and is very difficult to be performed out of the factory.

FIG. 4 shows a typical example of the reproducing apparatus of the conventional 4-head helical scan type video tape recorder.

In the 4-head system, there is a VHS system video tape recorder capable of switching over between 2-hour and 6-hour playback modes. The 2-hour playback mode requires about 60 $\mu$m video track width and the 6-hour playback mode needs about 20 $\mu$m video track width, so that two video heads must be used for each of the playback modes.

The heads 1 and 2 for 2-hour playback mode are selected to have a track width of about 60 $\mu$m and heads 17 and 18 for 6-hour playback mode to have a track width of about 20 $\mu$m. FIG. 4 is different from FIG. 1 in that the heads 17 and 18 are added thus to accompany a 4-channel rotary transformer 19, a peaking circuit associated with the head 17 which includes a variable resistor 25 and a trimmer capacitor 24, a peaking circuit associated with the head 18 which includes a variable resistor 27 and a trimmer capacitor 26, and switches 20, 21, 22 and 23 for changing over between the 2-hour and 6-hour playback modes.

In the 2-hour playback mode, the switches 20 to 23 are in the states as shown in FIG. 4, and thus the heads 1 and 2 are connected via the switches 20 and 21 to the preamplifiers 8 and 9 respectively. In addition, the circuit elements 4, 5, 6 and 7 constituting two peaking circuits are operative via the switches 22 and 23, but the circuit elements 24, 25, 26 and 27 constituting two peaking circuits are inoperative. In the 6-hour playback mode, the switches 20 to 23 are made in the states reverse to those in FIG. 4, and thus the heads 17 and 18 are connected to the preamplifiers 8 and 9 respectively. In addition, the circuit elements 24, 25, 26 and 27 are operative and the circuit elements 4, 5, 6 and 7 are inoperative.

The drawback of the apparatus of FIG. 4 is that as is apparent, since the number of playback heads are increased as compared to that of FIG. 1, the trimmer capacitor for peaking frequency adjustment and the variable resistor for the adjustment of the peaking amount are also required for each of additional head. This makes the apparatus more costly and takes more time for adjustment as compared with the 2-head system.

It is an object of the invention to provide a magnetic tape reproducing apparatus which eliminates the drawbacks of the conventional technique and is capable of dispensing with the adjustment of the head peaking circuit.

In order to achieve this object, the apparatus of the invention is constructed such that the outputs of a plurality of preamplifiers to which the output signals from the associated heads are applied, are negatively fed back to the inputs thereby to damp the head peaking characteristics fully so as to make the frequency characteristics of the sections from the respective heads to the associated preamplifiers substantially flat, and that the outputs of the respective preamplifiers are applied through a switching amplifier to a FM equalizer which operates common to the signals from the respective heads and which has a desired peaking characteristic.

According to one aspect of the invention, there is proposed a magnetic tape reproducing apparatus comprising a plurality of playback heads, a plurality of damping circuits each damping the output from the corresponding playback head so that the peaking characteristic determined by its equivalent resonant capacitance, its equivalent damping resistance, the inductance of the associated playback head, and the capacitance thereof will not govern a total reproduction equalizing characteristic, a switching circuit for sequentially passing the output signals from the plurality of damping circuits in turn, reproduction equalizer means for creating substantially the total reproduction equalizing characteristic for the output signal from the switching circuit, and a signal processor for converting the output signal from the reproduction equalizer circuit, to a recorded information signal.

The above and other objects, features and advantages of the present invention will be more clear from the following description with reference to the accompanying drawings, in which.

Figure 1:
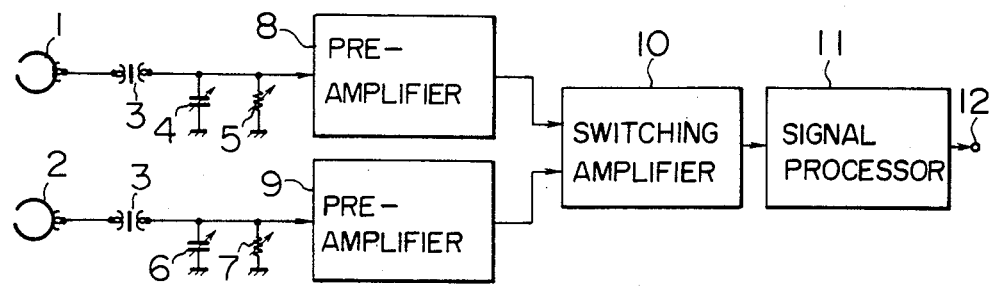
FIG. 1 is a block diagram of a typical example of the conventional 2-head helical scan type magnetic tape reproducing apparatus.
Figure 2:
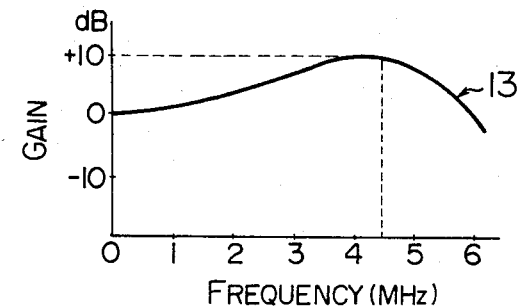
FIG. 2 shows a frequency characteristics of a head peaking circuit of the conventional reproducing apparatus of FIG. 1.
Figure 3:
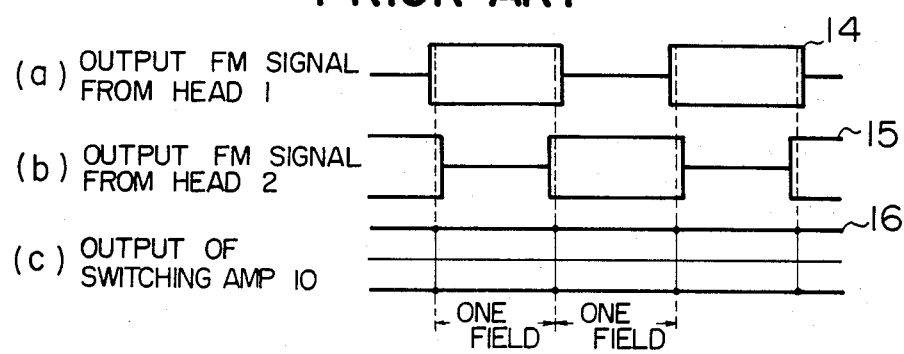
Figure 4:
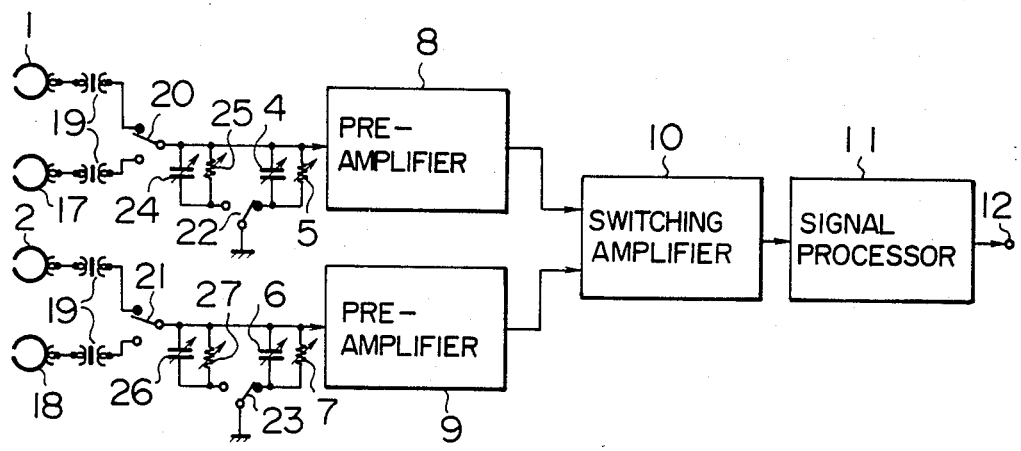
Figure 5:
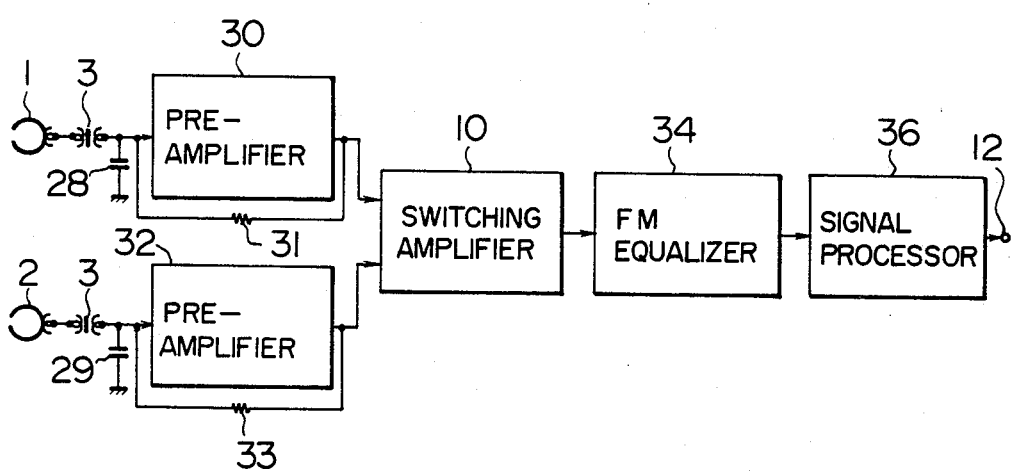
Figure 6:
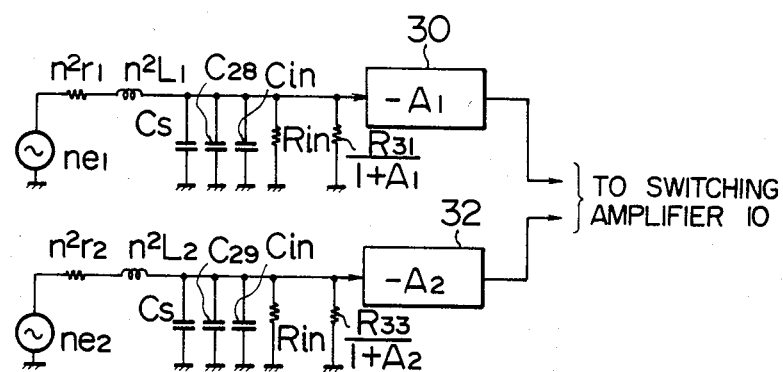
Figure 7:
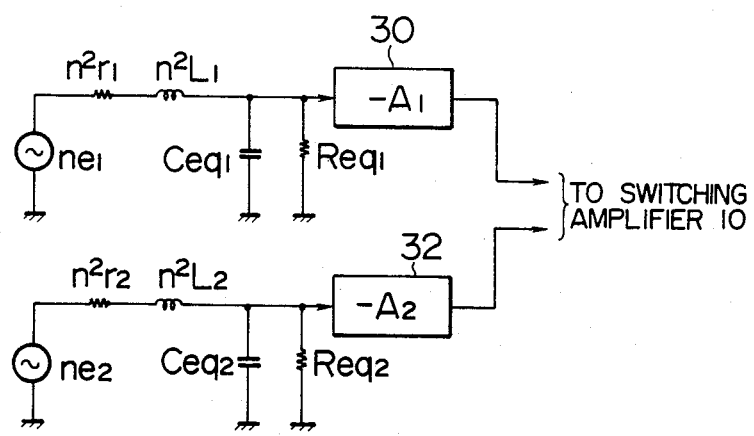
Figure 8:
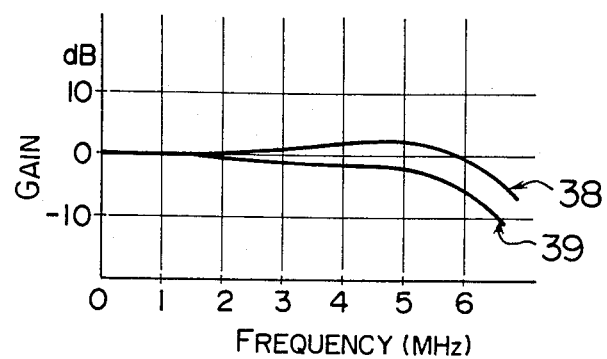
Figure 9:
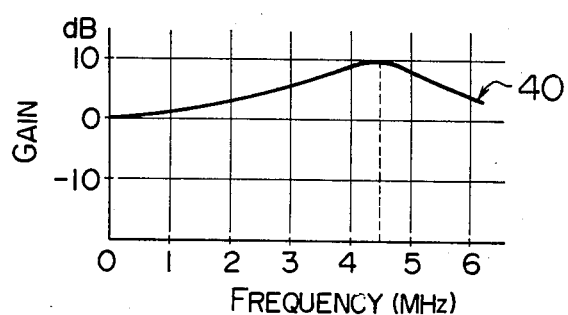
Figure 10:
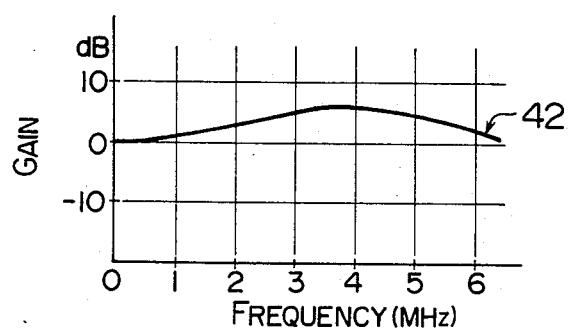
Figure 11:
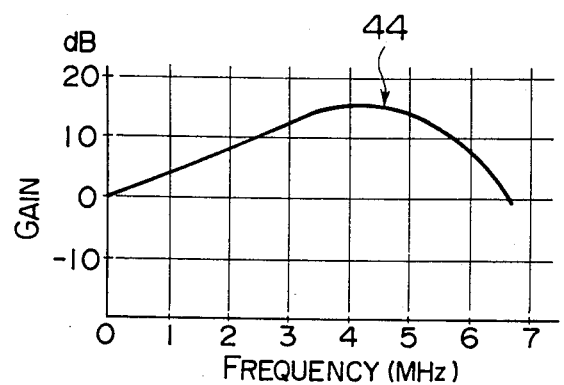
Figure 12:
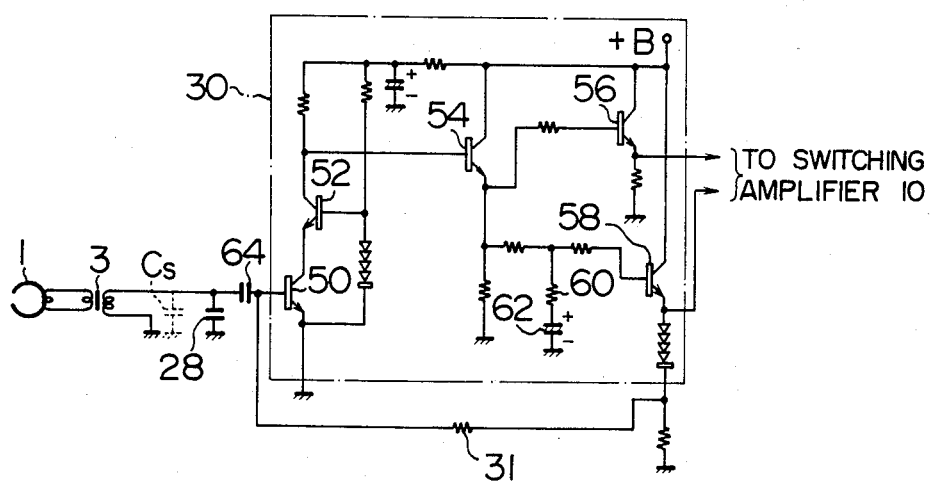
Figure 13A:
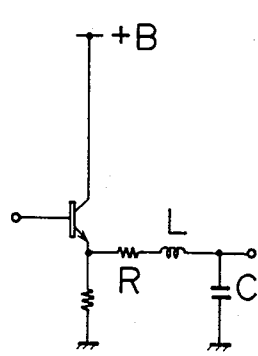
Figure 13B:
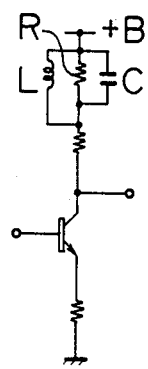
Figure 13C:
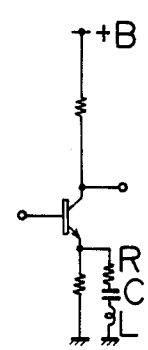
Figure 14:
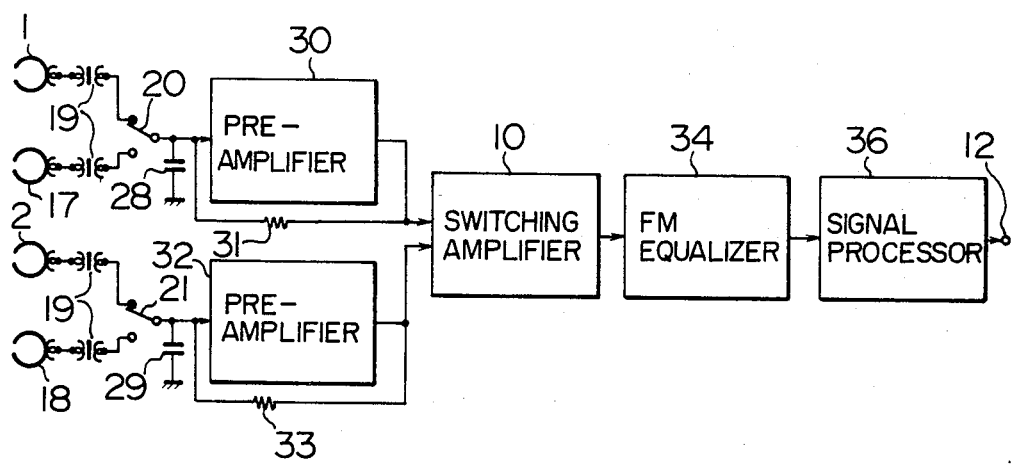
Figure 15:
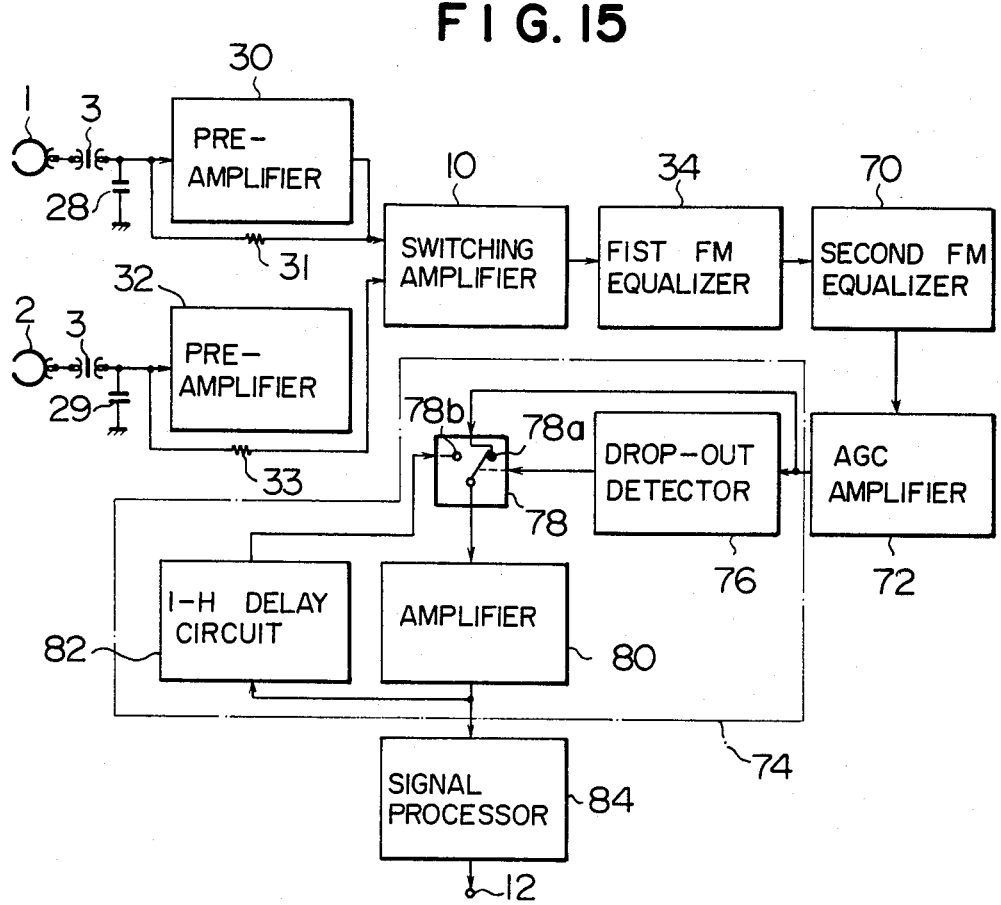
Figure 16:
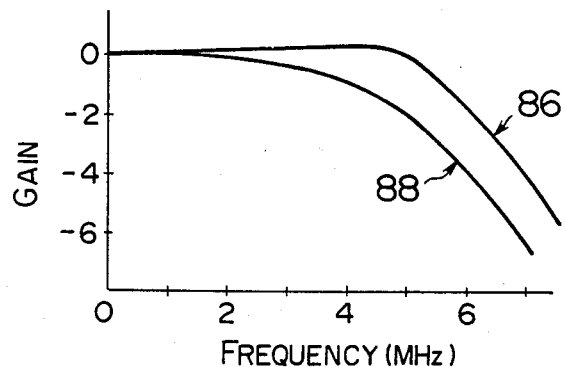
Figure 17:
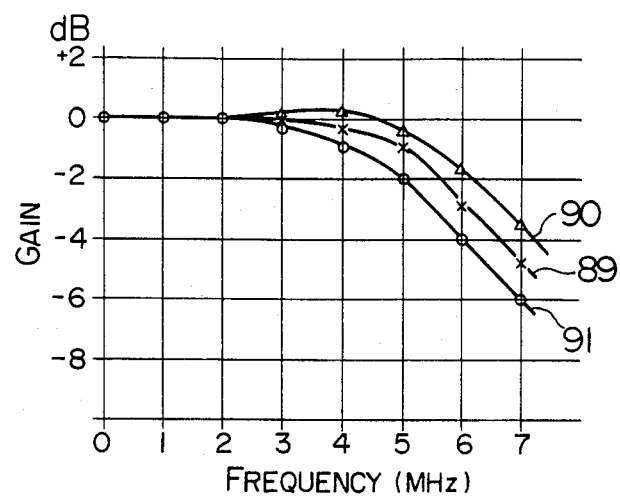
Figure 18:
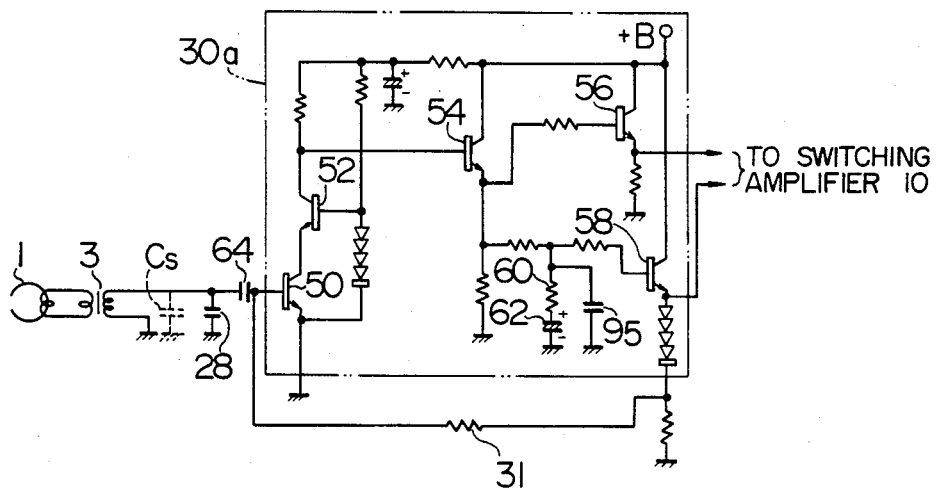
Figure 19:
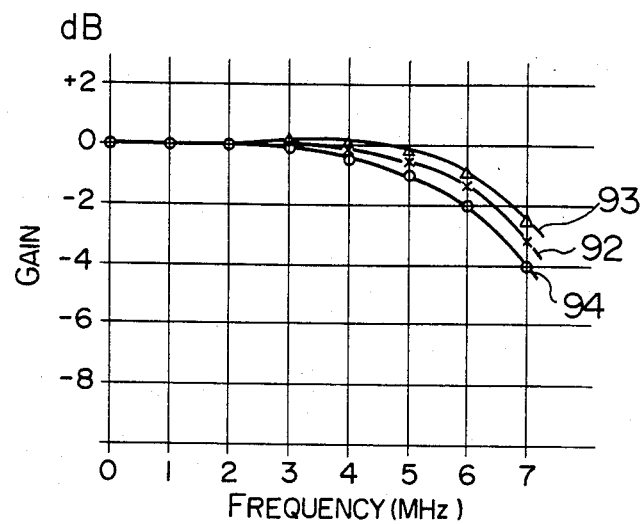
Figure 20:
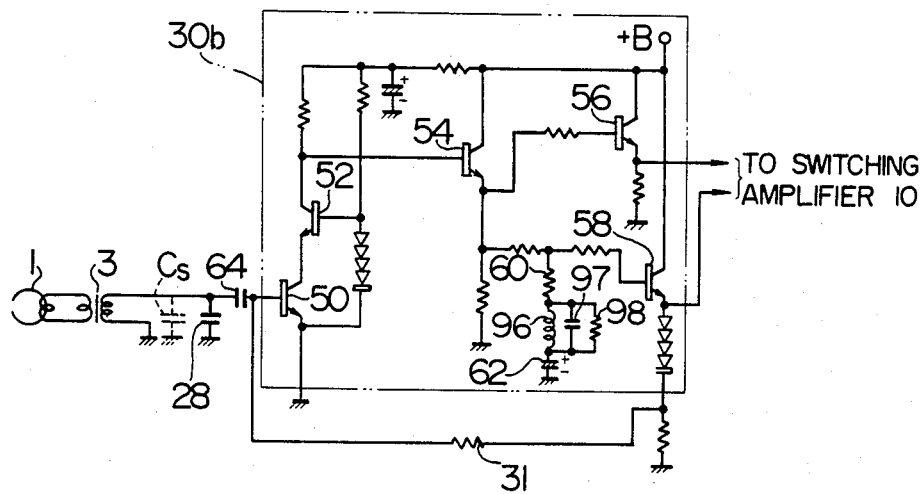

FIG. 3, consisting of (a)–(c) shows signal waveforms at the respective parts of the reproducing apparatus of FIG. 1;

FIG. 4 is a block diagram of a typical example of the conventional 4-head helical scan type magnetic tape reproducing apparatus;

FIG. 5 is a block diagram of one embodiment of the 2-head helical scan type magnetic tape reproducing apparatus according to the invention;

FIGS. 6 and 7 are equivalent circuit diagrams of a head amplifier circuit of the reproducing apparatus of FIG. 5;

FIG. 8 is a graph of frequency characteristic of the head amplifier circuit of FIG. 5;

FIGS. 9 and 10 are graphs of the FM equalizing characteristics of the reproducing apparatus of FIG. 5;

FIG. 11 is a graph of the total reproduction equalizing characteristic of the reproducing apparatus of FIG. 5;

FIG. 12 is a circuit diagram of one example of the preamplifier in the reproducing apparatus of FIG. 5;

FIGS. 13a, 13b and 13c are circuit diagrams of examples of the FM equalizer;

FIG. 14 is a block diagram of one embodiment of the 4-head helical scan type magnetic tape reproducing apparatus according to the invention;

FIG. 15 is a block diagram of one embodiment of the 2-head helical scan type magnetic tape reproducing apparatus having a drop-out compensator according to the invention;

FIGS. 16, 17 and 19 are graphs of the frequency characteristic of the head amplifier circuit in the reproducing apparatus; and FIGS. 18 and 20 show circuit diagrams of examples of the preamplifiers in the reproducing apparatus.

This invention will be described in detail with reference to the accompanying drawings, in which like elements are identified by the same reference numerals.

FIG. 5 is a block diagram of one embodiment of a 2-head helical scan type VTR (video tape recorder) to which this invention is applied. Hereinafter, the VTR of FIG. 5 is assumed to be of VHS system.

Referring to FIG. 5, the FM (frequency modulated) signals from the heads 1 and 2 are supplied via the rotary transformer 3 to preamplifiers 30 and 32, respectively. Between the rotary transformer 3 and the preamplifier 30 is connected a capacitor 28 and across the preamplifier 30 a feedback resistor 31. The head 1, rotary transformer 3, the capacitor 28, the preamplifier, and the feedback resistor 31 form a head preamplifier circuit (damping circuit). The values of the capacitor 28 and resistor 31 are properly selected to provide a nearly flat frequency characteristic of the head amplifier circuit for the video head 1 and the preamplifier 30 as shown in FIG. 8 by an area between curves 38 and 39. Similarly, a capacitor 29 is connected between the rotary transformer 3 and the preamplifier 32 and a feedback resistor 33 across the preamplifier 32. The head 2, the rotary transformer 3, the capacitor 29, the preamplifier 32 and the feedback resistor 33 constitute a head preamplifier circuit (damping circuit). The values of the capacitor 29 and the resistor 33 are properly selected to bring the frequency characteristic of the head preamplifier circuit for the video head 2 to an area between curves 38 and 39 of FIG. 8. The equivalent circuits of the head preamplifier circuits for the heads 1, 2 are shown in FIG. 6. In FIG. 6, the video head 1 has an output voltage $e_1$, an inductance $L_1$, and a series resistance component $r_1$, the video head 2 has an output voltage $e_2$, an inductance $L_2$, and a series resistance component $r_2$, the turn ratio of the rotary transformer 3 is 1:n, a stray capacitance between the rotary transformer 3 and the preamplifier 30 (32) is $C_s$, the input capacitance of each of the preamplifiers 30, 32 is $C_{in}$, the input resistance thereof is $R_{in}$, the capacitances of the capacitors 28 and 29 are $C_{28}$ and $C_{29}$, respectively, the gains of the preamplifiers 30 and 32 are $-A_1$, $-A_2$, respectively, and the values of the feedback resistors 31 and 33 are $R_{31}$ and $R_{33}$, respectively. FIG. 7 shows an equivalent circuit of FIG. 6, in which equivalent resonant capacitances $C_{eq1}$ and $C_{eq2}$ are expressed by $$C_{eq1} = C_s + C_{28} + C_{in}$$

$$C_{eq2} = C_s + C_{29} + C_{in}$$

From FIG. 7, the resonant angular frequency, $\omega_1$ in the peaking characteristic against the video head 1, and the damping characteristic, $Q_1$ are determined as $$\omega_1 = \sqrt{\frac{1}{n^2 L_1 \cdot C_{eq1}} \left( \frac{R_{eq1} + n^2 r_1}{R_{eq1}} \right)} \quad (1)$$

$$Q_1 = \frac{R_{eq1} + n^2 r_1}{\omega_1 (n^2 L_1 + C_{eq1} \cdot R_{eq1} \cdot n^2 r_1)} \quad (2)$$

Similarly, the resonant angular frequency $\omega_2$ and the damping characteristic $Q_2$ in the peaking characteristic against the head 2 is determined as $$\omega_2 = \sqrt{\frac{1}{n^2 L_2 \cdot C_{eq2}} \left( \frac{R_{eq2} + n^2 r_2}{R_{eq2}} \right)} \quad (3)$$

$$Q_2 = \frac{R_{eq2} + n^2 r_2}{\omega_2 (n^2 L_2 + C_{eq2} \cdot R_{eq2} \cdot n^2 r_2)} \quad (4)$$

Therefore, in order to make the frequency characteristics of the ouput signals from the preamplifiers 30 and 32 the same in the area between the curves 38 and 39 of FIG. 8, it is necessary that $\omega_1 = \omega_2$ and that $Q_1 = Q_2$.

Since generally $R_{eq1} \gg n^2 r_1$ and, $R_{eq2} \gg n^2 r_2$, then $$\omega_1 \approx \sqrt{\frac{1}{n^2 L_1 \cdot C_{eq1}}} \quad (5)$$

$$\omega_2 \approx \sqrt{\frac{1}{n^2 L_2 \cdot C_{eq2}}} \quad (6)$$

Thus, when the head inductances $L_1$ and $L_2$ are pregiven to have specific values, the resonant angular frequencies $\omega_1$ and $\omega_2$ are substantially determined by the $C_{eq1}$ and $C_{eq2}$, or values of the capacitors 28 and 29, respectively. In order to make $\omega_1$ equal to $\omega_2$, the following equation must be satisfied:

$$n^2 L_1 \cdot C_{eq1} \div n^2 L_2 \cdot C_{eq2} \quad (7)$$

If, now, the inductances of the heads 1 and 2 are substantially equal to each other, selection of the same value for the capacitors 28 and 29 will result in the fact that $\omega_1 = \omega_2$.

Since the FM carrier for the VHS system is selected to be in the range of 3.4 to 4.4 MHz, the peaking frequency is brought into the range of 4.4 to 6.0 MHz as shown in FIG. 8 by selecting appropriate values for capacitors 28 and 29. Now, in the VHS system, the white carrier frequency is 4.4 MHz. In other words, the peaking frequency is preferably brought to the frequency around or slightly (about 1 MHz) higher than the maximum frequency of the FM carrier. This setting increases the impedance of a circuit including the heads 1 and the capacitor 28, viewed from the preamplifier 30 and takes good noise matching of the preamplifier 30 (for the FM carrier frequency band).

On the other hand, since $n^2 L_1 \gg C_{eq1} \cdot R_{eq1} \cdot n^2 r_1$, and $n^2 L_2 \gg C_{eq2} \cdot R_{eq2} \cdot n^2 r_2$, then $$Q_1 = \frac{R_{eq1}}{\omega_1 \cdot n^2 L_1} \quad (8)$$

$$Q_2 = \frac{R_{eq2}}{\omega_2 \cdot n^2 L_2} \quad (9)$$

When the inductances $L_1$ and $L_2$ are pregiven, $Q_1$ and $Q_2$ are substantially determined by $R_{eq1}$ and $R_{eq2}$, respectively. Therefore, proper selection of values for the resistors 31 and 33 will provide approximately flat frequency characteristics of the output signals from the preamplifiers 30 and 32 as shown in the area between the curves 38 and 39 of FIG. 8. Moreover, in order to make $Q_1$ equal to $Q_2$, the following equation must be satisfied:

$$\frac{R_{eq1}}{n^2 L_1} \approx \frac{R_{eq2}}{n^2 L_2} \quad (10)$$

If, now, the inductances $L_1$ and $L_2$ of the heads 1 and 2 are substantially equal to each other, selection of equal value for the gains of the preamplifiers 30 and 32 and for the resistors 31 and 33 will result in the fact that $Q_1 = Q_2$. Thus, in order to make the frequency characteristics of the output signals from the preamplifiers 30 and 32 the same in the area between the curves 38 and 39 of FIG. 8, it is necessary to select equal capacitance value for the capacitors 28 and 29, equal gain for the preamplifiers 30 and 32, and equal resistance value for the resistors 31 and 33.

An appropriate value of Q is determined to be in a range of 0.6–1.2, preferably 0.84, by selecting values of resistors 31, 33 so that the output signals from the preamplifiers 30 and 32 are boosted by about 3 B or below in the vicinity of the peaking frequency. Now, the frequency characteristics of the head amplifier circuits for the heads 1 and 2 are required in the area between the curves 38 and 39 of FIG. 8 but not necessarily to be same.

The output signals from the preamplifiers 30 and 32 are transmitted to the switching amplifier 10 through which the signals are alternately passed to an FM equalizer circuit 34.

The FM equalizer circuit 34 is a peaking amplifier having the frequency characteristic as shown in FIG. 9 by a curve 40. This equalizer circuit 34 serves to boost the output signals from the preamplifiers 30 and 32 by about 10 dB at frequency of 4.5 MHz preferably.

The output from the FM equalizer circuit 34 is applied to a signal processor 36 where it is converted to a video signal, which appears at the terminal 12. The signal processor 36 has a second FM equalizer circuit, a limiter, an FM demodulator, a de-emphasis circuit, etc.

The frequency characteristic of the second FM equalizer circuit is shown in FIG. 10 by a curve 42. Thus, the total equalizer characteristic for the output signals reproduced from the video heads 1 and 2 is shown in FIG. 11 by a curve 44.

In this way, the output signals from the video heads 1 and 2 are applied to the corresponding preamplifiers 30 and 32, the outputs of which are fed back to the inputs, thereby sufficiently damping the head peaking characteristic to make the frequency characteristic of each of the head preamplifier circuits for the video heads 1 and 2 substantially constant. Then, the outputs of the preamplifiers 30 and 32 are alternately applied through the switching amplifier 10 to the common FM equalizer circuit 34, the output of which is thus obtained in accordance with the desired total reproduction equalizing characteristic as shown in FIG. 11 by the curve 44.

Thus, since the output signals from the video heads 1 and 2 are equalized according to the same peaking characteristic shown by the curve 44, equal picture quality is attained for each field, and flicker does not occur.

If the inductances of the heads 1 and 2 are considerably different from each other, the frequency characteristics of the head preamplifier circuits for the heads 1 and 2 greatly differ. Consequently, the peaking amount in the total reproduction equalizing characteristic changes to cause picture quality difference between fields, resulting in occurence of flicker. The allowable difference between the inductances of the heads 1 and 2, which is necessary for the flicker to be negligible is about 5 to 10% at maximum.

In this embodiment, the heads 1 and 2 employ only an equal inductance for adjustment of each head peaking and thus replacement heads will not need peaking adjustment.

FIG. 12 is a circuit diagram of the preamplifier 30. The preamplifier 32 is assumed to be of the same construction.

The preamplifier 30 is supplied at its input with an AC component of a signal from the head 1 via a capacitor 64 which cuts off the dc component of the input signal. In the preamplifier 30, transistors 50 and 52 constitute a cascode amplifier, the output of which is applied via a transistor 54 to transistors 56 and 58. The feedback resistor 31 supplies a dc bias to the transistor 50, and negatively feeds the output of the preamplifier 30 back to the input thereof to damp the output signal. A resistor 60 determines the amount of the AC negative feedback. If the value of the resistor 60 is selected to be large, the amount of negative feedback is increased. A capacitor 62 supplies a dc bias to the transistor 56. The transistor 56 produces a dc component and an ac component (FM signal component), and the transistor 58 produces mostly dc component. The difference between the outputs of the transistors 56 and 58 is applied as the FM signal component to the switching amplifier 10.

FIGS. 13a, 13b and 13c show examples of the FM equalizer circuit 34 or the FM equalizer circuit within the signal processor 36. The circuits of FIGS. 13a, 13b and 13c are emitter resonance, collector resonance, and emitter resonance circuits, respectively. The frequency characteristic of each of the resonance circuits is determined by the values of a resistor R, capacitor C and inductance L. The FM equalizer circuit to be used may be any one of the circuits of FIGS. 13a, 13b and 13c, or the combination of the circuits of FIGS. 13a, 13b and 13c.

FIG. 14 is a block diagram of a 4-head helical scan type VTR to which the invention is applied.

Hereinafter, the VHS system VTR of the above type having two-hour playback mode and 6-hour playback mode switching function will be described with reference to FIG. 14.

The heads 1 and 2 for a 2-hour playback mode are selected to have a track width of about 60 $\mu$m and heads 17 and 18 for a 6-hour playback mode are selected to have a track width of about 20 $\mu$m. Thus, the ratio of speed of the tape for the 2-hour mode to the 6-hour mode is an integer n which is greater than 1.

The video heads 1 and 2 are for 2-hour playback mode and the inductances of the heads 1 and 2 are desirably almost equal as described previously. The heads 17 and 18 are for 6-hour playback mode, and the inductances thereof must be selected within the inductance value difference of about 5 to 10% at maximum.

The heads 1 and 17 are connected via the rotary transformer 19 and the common playback mode selection switch 20 to the preamplifier 30. The heads 1 and 17 share a common head amplifier circuit including the capacitor 28, preamplifier 30 and resistor 31.

The heads 2 and 18 are connected via the rotary transformer 19 and the playback mode selecting switch 21 to the preamplifier 32. The heads 2 and 18 share a common head amplifier circuit including the capacitor 29, preamplifier 32 and resistor 33. If the inductances of the heads 1 and 2 are approximately equal, and those of the heads 17 and 18 are substantially equal, the peaking frequency characteristics for the heads 1 and 2 are made the same in the area between the curves 38 and 39 of FIG. 8 by selecting equal value for the capacitors 28 and 29, equal gain for the preamplifiers 30 and 32, and similarly equal value for the resistors 31 and 33, and those for the heads 17 and 18 are similarly made the same as in the area between the curves 38 and 39 by selecting as above. Therefore, the total equivalent characteristic for the video signal reproduced from the signal processor 36 via the preamplifiers 30 and 32, the switching amplifier 10, and FM equalizer circuit 34, is represented by the curve 44 of FIG. 11 although the switches 20 and 21 are changed to either 2-hour playback mode position or 6-hour playback mode position.

The inductances of the heads 1 and 17 or heads 2 and 18 may slightly differ from each other, or the difference of the inductance values is allowable to about 20%. In other words, either the heads 1 and 2 are simultaneously selected or the heads 17 and 18 are selected at a time, i.e., the heads 1 and 17, or 2 and 18 are never selected at the same time. In either case, the peaking frequency characteristics for each pair of heads 1 and 2, or 17 and 18 are equal thus to cause no flicker. If, however, the inductance difference between the heads 1 and 17 or 2 and 18 is very great, the peaking frequency characteristic difference between the 2-hour and 6-hour playback modes becomes considerably large. Consequently, the total reproduction equvalent characteristics for both the modes differ, resulting in deterioration of picture quality. This difference is permissible to about 20% at maximum.

Thus, for the 4-head system, if each pair of heads have almost equal inductance value, the adjustment of each head preamplifier circuit is unnecessary. Moreover, since a common head amplifier circuit can be used for the heads 1 and 17, and another common head preamplifier circuit can be used for the heads 2 and 18, the whole circuit construction becomes simple The capacitors 28 and 29 are selected to provide as shown in the area between the curves 38 and 39 of FIG. 8 and a resonant frequency in the range from 4.4 to 6.0 MHz at the input of the preamplifier, as is similar to the embodiment of FIG. 5.

In addition, the output signals from the preamplifiers 30 and 32 are boosted about 3 dB or below in the vicinity of the peaking frequency by selecting appropriate values of the resistors 31 and 33.

FIG. 15 shows an example of a 2-head helical scan type VTR having a drop-out compensator, to which this invention is applied. The feature of the example of FIG. 15 is the addition of a second FM equalizer circuit 70 following the FM equalizer circuit 34, an AGC amplifier 72 for making the output FM signal level from the circuit 70 constant, and a known drop-out compensator 74 consisting of a drop-out detector 76, a switch 78, an amplifier 80, and a 1-H delay circuit 82. The second FM equalizer circuit 70 is designed to have the characteristic as shown in FIG. 10 by the curve 42 for the VHS system VTR, and as a result the total characteristic of the FM equalizer circuits 34 and 70 is selected as shown in FIG. 11 by the curve 44.

The AGC amplifier 72 is provided for improving the performance of the drop-out compensator. In other words, the detection level (threshold level) for the drop-out of the output FM signal from the second FM equalizer circuit is selected to be about 1/10 the usual output FM signal level, to thereby optimize the picture quality of video signal after drop-out compensation. If the threshold level is higher than this selected level, the imperceptible short drop-out is also compensated for, and as a result the switching noise occurring due to the compensation appears in the picture.

That is, when the drop-out detector 76 detects a drop-out in the output signal from the AGC amplifier 72, the level of which is lower than the drop-out detection level, the movable contact of the switch 78 is switched from a terminal 78a to a terminal 78b. At this time, a phase difference occurs between the output of the AGC amplifier 72 and the output of the 1-H delay circuit 82 for delaying 1 H (one holizontal scanning line) the output of the amplifier 80, and thus the picture quality of the video signal after compensation may deteriorate.

If the threshold level is lowered, the drop-out in not fully conpensated for. On the other hand, the levels of the signals from the heads greatly vary depending on the recording condition and the kind of tape used. Thus, it is desirable that preferably the drop-out detection level is selected to be about 1/10 the average output level. To this end, the AGC amplifier 72 is provided just before the detector 76 thereby to make the average output level constant.

With this construction, however, when a magnetic tape on which signals are recorded at low levels is reproduced, it often occurs that no drop-out is detected successfully. Under this situation, the AGC amplifier 72 increases its gain to sometimes amplify the tape noise and amplifier noise to 1/10 the average output level or above, and therefore it becomes impossible to detect the drop-out.

To solve this problem, it is absolutely necessary to minimize the input level of the tape noise and amplifier noise to the drop-out detector 76. Specifically, it is necessary to restrict the band width of the FM signal supplied to the drop-out detector 74.

In other words, since the FM carrier is in the range from 3.4 to 4.4 MHz, a filter for passing about this frequency band should be provided before the AGC amplifier 72. In this embodiment, however, such a filter is not provided but the FM signal passed through the FM equalizer circuits 34 and 70 is conducted to the drop-out detector 76.

More specifically, since the total reproduction equalizer characteristic of the equalizer circuits 34 and 70 has the peaking frequency in the vicinity of the highest frequency of the FM carrier the characteristic is also utilized for the filter.

The output of the drop-out compensator 74 is applied via a signal processor 84 to the terminal 12 as a video signal. The signal processor 84 includes an FM demodulator, a de-emphasis circuit, etc.

As described above, for satisfactory compensation to drop-out the drop-out compensator is provided after the FM equalizer circuits 34 and 70 and no particular filter is provided before the compensator. The circuit arrangement of FIG. 15 is also applicable to the 4-head helical scan type VTR of FIG. 14.

In the above description it should be assumed that the inductance values of each pair of heads is approximately equal to the extent of 5 to 10% error range at maximum.

However, in the recent VTR, the track widths of paired video heads are made different for slow or still reproduction. Thus, the inductance values of the video heads become difficult to equalize. That is, for a head, the increase of track width with the same number of turns of coil will increase the inductance. Thus, the inductances are made equal by decreasing the number of turns of the wide track width head to a number smaller than that of the narrow track width head. Since the number of turns of a head is usually about 20, the inductances of the heads even with different track widths can be made close in value to each other within about 5% difference (since the inductance of head is proportional to the square of the number of turns, the inductance is decreased 10% with one-turn decrease).

However, a large number of turns of a video head, for example, 20 turns results in reduction of productivity of a head, and therefore it is preferred to greatly reduce the number of turns. If, for example, the number of turns could be reduced to about 5 turns, the optimization of the number of turns for equalizing inductance of different track width heads will result in about 20% difference between inductances.

Consequently, use of capacitors 28 and 29 of equal value and also resistors 31 and 33 of equal value as is similar to the embodiment of FIG. 5 will result in provision of greatly different head peaking characteristics for the head amplifier circuits for the heads 1 and 2 as shown in FIG. 16 by curves 86 and 88, which easily cause the reproduced picture quality to deteriorate. The curve 86 shows the case where the head inductance is smaller than that for the curve 88.

In the embodiment of FIG. 5, it will be understood that Eq. (7) ($C_{eq1} \div C_{eq2}$) must be satisfied to make the peaking angular frequencies $\omega_1$ and $\omega_2$ the same, and Eq. (10)

$$\left( \frac{R_{eq1}}{n^2 L_1} \approx \frac{R_{eq2}}{n^2 L_2} \right)$$

must be satisfied to make the impedance characteristics $Q_1$ and $Q_2$ the same.

In other words, if, for example, the inductance $L_2$ of the video head 2 is larger than the inductance $L_1$ of the video head 1, the $C_{eq2}$ is made smaller than $C_{eq1}$ in order to make the peaking angular frequencies $\omega_1$ and $\omega_2$ the same, i.e., the $C_2$ is selected to be smaller than the $C_1$. Moreover, to make the damping characteristics $Q_1$ and $Q_2$ the same, $R_{eq2}$ is selected to be larger than $R_{eq1}$, i.e., $$\frac{R_{33}}{1+A_2}$$

is made larger than $$\frac{R_{31}}{1+A_1}.$$

More specifically, when $A_1=A_2$, $R_{33}$ is made larger than $R_{31}$, and when $R_{31}=R_{33}$, $A_1$ is made larger than $A_2$.

That is, in the head amplifier circuit for the video head with high inductance value, the equivalent resonant capacitance and feedback resistance are selected to be smaller and larger than those of the head amplifier circuit for the video head with low inductance value, respectively.

Other embodiments of the invention will hereinafter be described.

FIG. 17 shows the frequency characteristics of the output of the preamplifier 30 for relative inductance values of 0, $-15\%$ and $+15\%$ with respect to a standard value as indicated by curves 89, 90 and 91, respectively.

In the frequency characteristic for the standard value of inductance as shown in FIG. 17, $\omega_1$ and $Q_1$ are selected to be about $2\pi \times 5$ MHz and 0.8 by Eqs. (1) and (2), respectively.

The VTR performance is most dependent upon the output gain difference between 3 to 6 MHz of the output frequency of the preamplifier. This gain difference is $-3$ dB for the standard characteristic shown by the curve 89, $-1.8$ dB for the characteristic 90, and $-4$ dB for the characteristic 91. Although it is permissible that the picture quality deteriorates due to the output gain difference variation, $-1.8$ dB to $-4$ dB in each of the preamplifiers 30 and 32, a higher performance of VTR can be attained by the following way. FIG. 18 shows a preamplifier 30a which is another example of the preamplifier 30 for achieving the above object. The example of FIG. 18 is different from that of FIG. 12 in that a capacitor 95 is added, and the value of the resistor 61 for determining the gain with feedback is slightly increased.

FIG. 19 shows the frequency characteristics of the head preamplifier circuit including the preamplifier 30a of FIG. 18, which characteristics corresponds to that of FIG. 17.

In FIG. 19, 92 indicates a frequency characteristic curve for a standard inductance value, 93 a frequency characteristic curve for a relative inductance value of $-15\%$ with respect to the standard value and 94 a frequency characteristic curve for a relative inductance value of $+15\%$ with respect thereto.

The preamplifier output gain difference between 3 and 5 MHz. In $-1.0$ dB to $-2.0$ dB, which indicates that the gain difference variation can be reduced to $\frac{1}{2}$ that of FIG. 17. This reduction is due to the fact that by increasing the value of the resistor 60 in FIG. 18 by 10 to 20% with respect to that in FIG. 12, the value of $Q_1$ of Eq. (1) is determined to be about 0.7. In order to decrease the amount of feedback at harmonics a capacitor 95 is provided. Thus, the head peaking frequency ($\omega_1$ in Eq. (1)) can be increased equivalently. That is, the $R_{eq1}$ at 4 MHz is made the same as in FIG. 12 and the $R_{eq1}$ at 6 MHz is increased to a value larger than that value in FIG. 12. The $\omega_1$ can easily be increased by decreasing the value of the capacitor 28, but the noise matching as described above occurs.

In FIG. 18, the preamplifier 30a has a capability of extending its operation bandwidth with the noise matching maintained, and thus serves to substantially remove the influence of the inductance variation of the head 1.

In FIG. 18, a resistor or inductor may be connected in series with the capacitor 95, to thereby enable the flattening of the frequency characteristic to be precisely restricted.

FIG. 20 shows a preamplifier 30b which is another example of the preamplifier 30 for achieving the same object as that in FIG. 18. The example of FIG. 20 is different from that of FIG. 12 in that in FIG. 20 an inductor 96, a capacitor 97 and a resistor 98 are connected between the resistor 60 and the capacitor 62 in FIG. 12.

If the value of the resistor 60 in FIG. 20 is slightly reduced to be smaller than the value of the resistor 60 in FIG. 12, and the resonant frequency of the parallel resonant circuit of the inductor 96 and the capacitor 97 is selected to be in the vicinity of the head peaking frequency, thereby providing a similar frequency characteristic to that in FIG. 19. Although the preamplifier in FIG. 20 is more complicated in circuit arrangement than that in FIG. 18, the scattering of the frequency characteristic due to the variation in the head inductance value can be reduced to be narrower than that in FIG. 19.

This example can, of course, be used in the embodiment of FIG. 14.

The apparatus of the invention is thus capable of dispensing with two adjustments for each of the head amplifier circuits. For the 2-head system VTR, a total of four adjustments can be dispensed with and for the 4-head system VTR, a total of eight adjustments and two switching circuits can be omitted, with the two common head amplifier circuits used for simple arrangement. Moreover, readjustment of peaking is not necessary upon head renewal, with the result that the service out of the factory becomes more effective. Moreover, the reproduction characteristic for each field becomes equal to cause no flicker, thus improving the picture quality.

While the VHS system VTR to which the invention is applied has been described above, the appatus of this invention can be used for another system VTR such as the beta system VTR, by changing the peaking characteristic and FM equalizer characteristic, and further the apparatus of the invention can be used for the andio PCM signal reproducing apparatus.

What is claimed is:

1. A magnetic tape reproducing apparatus comprising:
    first, second, third and fourth playback heads;

first and second playback mode switches each having first and second positions;

first and second damping circuit means, the first damping circuit means being selectively connectable to said first and third playback heads by the positioning of said first playback mode switch, the second damping circuit means being selectively connectable to said second and fourth playback heads by the positioning of said second playback mode switch, the first and second playback heads operating during a first tape feeding speed in the first playback mode and the third and fourth playback heads operating during a second tape feeding speed in the second playback mode;

said first and second playback heads in said first playback mode being connected via said first and second playback mode switches to said first and second damping circuit means respectively while in said second playback mode said third and fourth playback heads being connected via said first and second playback mode switches to said first and second damping circuit means respectively;

each damping circuit means damping the output from the playback head to which it is connected so that the peaking characteristic is substantially flat as a function of frequency in the frequency band of the recorded signal, the peaking characteristic being determined by its equivalent capacitance, its equivalent damping resistance, the inductance of the playback head to which it is connected, and the capacitance, the peaking characteristic not governing a total reproduction equalizing characteristic, each of the damping circuit means including a preamplifier having an input and an output between which is coupled a feedback resistance;

said playback heads each have substantially equal inductance and the equivalent resonant capacitance and equivalent damping resistance of the first and second damping means are equal;

a switching circuit for sequentially passing the output signals from said first and second damping circuits in turn, the outputs of the preamplifiers being coupled to said switching circuit;

reproduction equalizer means for creating substantially the total reproduction equalizing characteristic for the output signal from the switching circuit;

a signal processor for converting the output signal from the reproduction equalizer circuit, to a recorded information signal; and wherein each of said damping circuit means includes an emitter grounded amplifier having a first transistor, the base of which is supplied with an output signal from the associated video head, a base grounded amplifier having a second transistor, the emitter thereof is connected to the collector of said first transistor, and a resistor connected between the base of said first transistor and an output terminal connected to the collector of said second transistor through an emitter follower to thereby apply the collector output signal of said second transistor to the base of said first transistor together with a D.C. bias current through said emitter follower and said resistor.

2. A magnetic tape reproducing apparatus comprising:

first and second playback heads;

two damping circuit means, each coupled to a different playback head, each damping circuit means damping the output from the corresponding playback head so that the peaking characteristic is substantially flat as a function of frequency in the frequency band of the recorded signal, the peaking characteristic being determined by its equivalent capacitance, its equivalent damping resistance, the inductance of the associated playback head, and the capacitance, the peaking characteristic not governing a total reproduction equalizing characteristic, each of the damping circuit means including a preamplifier having an input and an output between which is coupled a feedback resistance;

said first and second playback heads each having substantially equal inductance, and the equivalent resonant capacitance and equivalent damping resistance of the damping circuit means associated with said first playback head are equal to those of the damping circuit associated with said second playback head;

a switching circuit for sequentially passing the output signals from said two damping circuit means in turn, the output of the preamplifier being coupled to said switching circuit;

reproduction equalizer means for creating substantially the total reproduction equalizing characteristic for the output signal from the switching circuit, the reproduction characteristic having a maximum amplification in the vicinity of the frequency of a FM carrier used for recording signals to be recorded;

a signal processor for converting the output signal from the reproduction equalizer circuit, to a recorded information signal, and an automatic gain control circuit connected to said reproduction equalizer means for making the output level of said reproduction equalizer means constant and delivering the constant level output, and a drop-out detector connected to the output of said automatic gain control circuit for performing the drop-out compensation for the constant level output from said automatic gain control circuit.

3. A magnetic tape reproducing apparatus according to claim 2, wherein each of said damping circuit means includes an emitter grounded amplifier having a first transistor, the base of which is supplied with an output signal from the associated video head, a base grounded amplifier having a second transistor, the emitter thereof is connected to the collector of said first transistor, and a resistor connected between the base of said first transistor and an output terminal connected to the collector of said second transistor through an emitter follower to thereby apply the collector output signal of said second transistor to the base of said first transistor together with a D.C. bias current through said emitter follower and said resistor.

4. A magnetic tape reproducing apparatus according to claim 2, further comprising an automatic gain control circuit connected to said reproduction equalizer means for making the output level of said reproduction equalizer means constant and delivering the constant level output, and a drop-out detector connected to the output of said automatic gain control circuit for performing the drop-out compensation for the constant level output from said automatic gain control circuit.

5. A magnetic tape recording apparatus according to claim 4, wherein said reproduction equalizer means includes a first equalizer connected to the output of said switching circuit, and a second equalizer connected to the output of said first equalizer, the second equalizer having a peaking frequency different from that of said first equalizer.

6. A magnetic tape reproducing apparatus in accordance with claim 2 wherein the FM carrier is in a range from 3.4 to 4.4 MHz.

7. A magnetic tape reproducing apparatus comprising:

first and second playback heads;

two damping circuit means, each coupled to a different playback head, each damping circuit means damping the output from the corresponding playback head so that the peaking characteristic is substantially flat as a function of frequency in the frequency band of the recorded signal, the peaking characteristic being determined by its equivalent capacitance, its equivalent damping resistance, the inductance of the associated playback head, and the capacitance, the peaking characteristic not governing a total reproduction equalizing characteristic, each of the damping circuit means including a preamplifier having an input and an output between which is coupled a feedback resistance;

said first and second playback heads each having substantially equal inductance, and the equivalent resonant capacitance and equivalent damping resistance of the damping circuit means associated with said first playback head are equal to those of the damping circuit associated with said second playback head;

a switching circuit for sequentially passing the output signals from said two damping circuit means in turn, the output of the preamplifier being coupled to said switching circuit;

reproduction equalizer means for creating substantially the total reproduction equalizing characteristic for the output signal from the switching circuit;

a signal processor for converting the output signal from the reproduction equalizer circuit, to a recorded information signal; and wherein each of said damping circuit means includes an emitter grounded amplifier having a first transistor, the base of which is supplied with an output signal from the associated video head, a base grounded amplifier having a second transistor, the emitter thereof is connected to the collector of said first transistor, and a resistor connected between the base of said first transistor and an output terminal connected to the collector of said second transistor through an emitter follower to thereby apply the collector output signal of said second transistor to the base of said first transistor together with a D.C. bias current through said emitter follower and said transistor.

* * * * *